Figure 4:
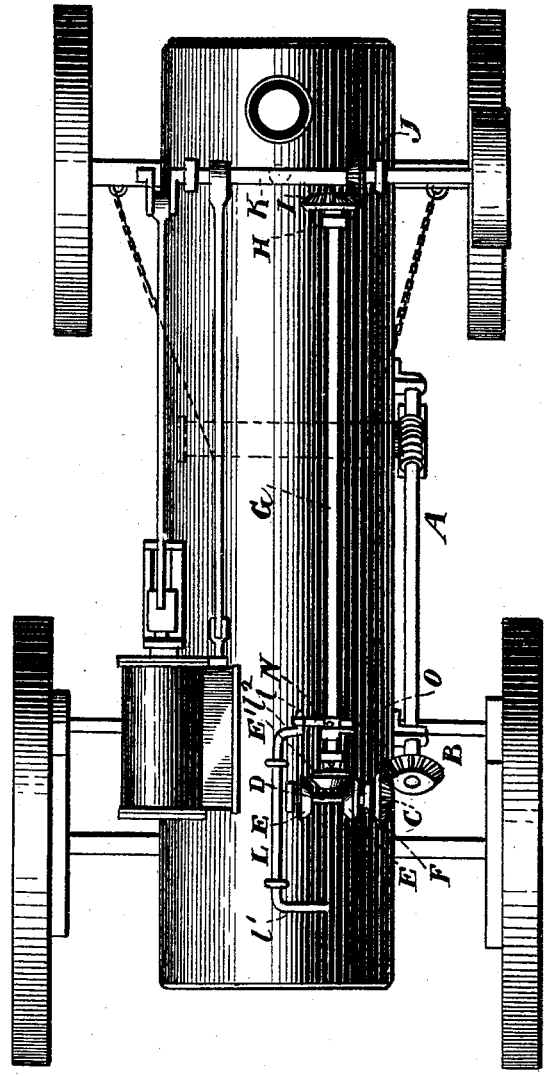

(No Model.)  2 Sheets—Sheet 1.
R. FULLERTON.
STEERING DEVICE FOR ROAD ENGINES.
No. 496,053.  Patented Apr. 25, 1893.
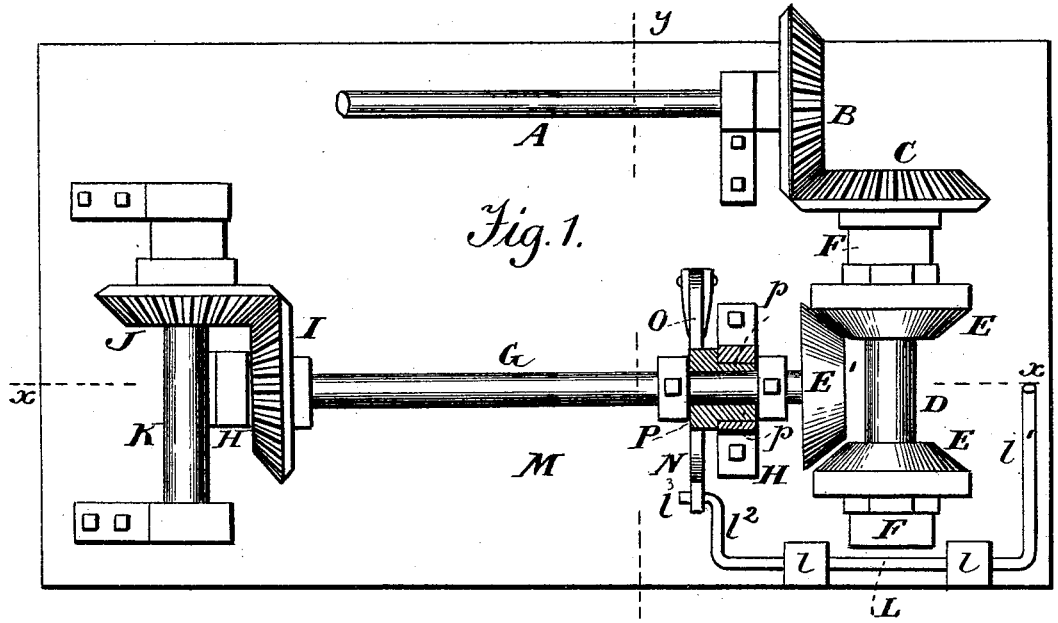
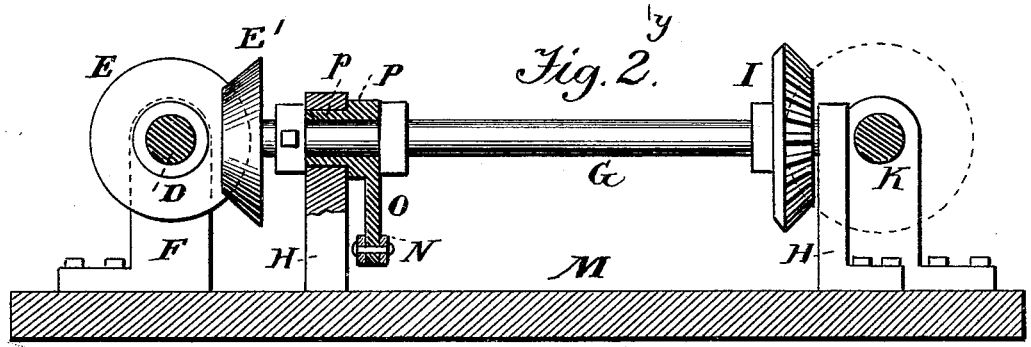
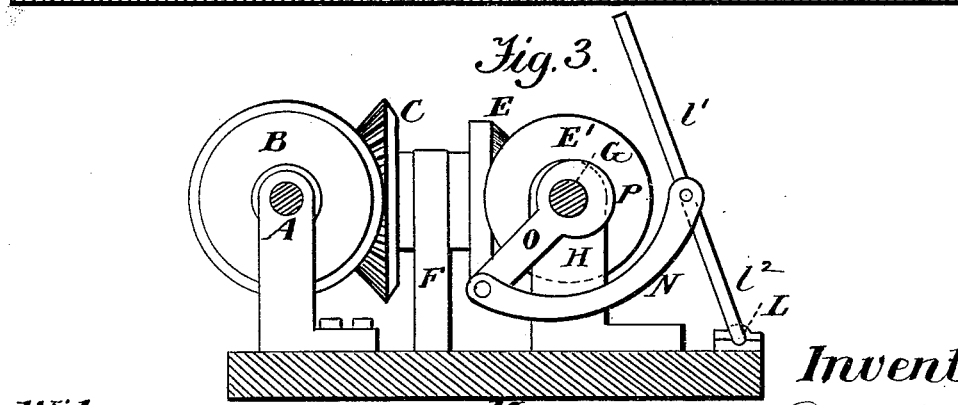
Witnesses.
A. Ruppert.
H. A. Daniels
Inventor.
Robert Fullerton
Per
Thomas P. Simpson
Atty (No Model.) 2 Sheets—Sheet 2.
R. FULLERTON.
STEERING DEVICE FOR ROAD ENGINES.

No. 496,053. Patented Apr. 25, 1893.

Witnesses.
A. Ruppert.
H. A. Daniel.

Inventor:
Robert Fullerton,
Per
Thomas P. Simpson.
atty.

UNITED STATES PATENT OFFICE.

ROBERT FULLERTON, OF MARTIN, TENNESSEE.

STEERING DEVICE FOR ROAD-ENGINES.

SPECIFICATION forming part of Letters Patent No. 496,053, dated April 25, 1893.

Application filed September 2, 1892. Serial No. 444,877. (No model.)

*To all whom it may concern:*

Be it known that I, ROBERT FULLERTON, a citizen of the United States, residing at Martin, in the county of Weakley and State of Tennessee, have invented certain new and useful Improvements in Steering Devices for Road-Engines; and I do hereby declare the following to be a full, clear, and exact description of the invention, such as will enable others skilled in the art to which it appertains to make and use the same.

The special object of the invention is to guide a traction road-engine automatically through the intervention of a friction mechanism as hereinafter described.

The invention will first be described in connection with the drawings and then pointed out in the claim.

Figure 1 of the drawings is a plan view; Fig. 2 a longitudinal vertical section on the dotted line $x\,x$ of Fig. 1, and Fig. 3 a vertical cross-section on the dotted line $y\,y$ of Fig. 1; Fig. 4 a plan view showing my steering mechanism attached to a road engine.

In the drawings, A represents the main shaft of the engine which I connect by means of the bevel gear wheels B C with a shaft D carrying the oppositely beveled friction wheels E E. This shaft D is arranged in the raised bearings F F and is thus driven always in one direction by the shaft A.

G is a shaft arranged at right angles to the shaft D in the upright bearings H H and carrying the beveled friction wheel E' which comes between the wheels E E on the shaft D to be rotated in one of two opposite directions according to which wheel E it is brought in contact with. On the other end of the shaft G which is at right angles to shaft D is a bevel spur wheel I meshing with a similar wheel J on the shaft K which operates the steering mechanism.

L represents a crank-shaft arranged on suitable bearings $l\,l$ on the base plate M to which are screwed the several bearings or uprights which contain the bearings of the several shafts. This shaft has the long handle arm $l'$ and a short arm $l^2$ with the right angled integral end or pin $l^3$. The pin $l^3$ is connected by the curved and end pivoted link N to an arm O on the sleeve P which forms a bearing for the shaft G, the said bearing $p$ being eccentric on the inside and capable of being turned within the bearing in the upright H, to throw the friction wheel E' from one to the other of the friction wheels E E. In this way, the road engine may be turned to one side or the other simply by manipulating the crank shaft L.

Having thus described all that is necessary to a full understanding of my invention, what I claim as new, and desire to protect by Letters Patent, is—

In road engines, the combination with three friction disks connected by a longitudinal rod and spur wheels with the main shaft of the engine, of an eccentric arranged on the inside of the back end of the said longitudinal rod and operated by a handle-arm connected therewith by an end pivoted link substantially as shown and described.

In testimony whereof I affix my signature in presence of two witnesses.

ROBT. FULLERTON.

Witnesses:
CHAS. L. BISHOP,
J. H. THOMAS, Jr.